United States Patent
Phillips et al.

(10) Patent No.: US 9,953,197 B2
(45) Date of Patent: Apr. 24, 2018

(54) PROCESSES FOR DISTRIBUTION AND USE OF A MOBILE RFID CONTAINER

(71) Applicant: Promega Corporation, Madison, WI (US)

(72) Inventors: Travis Phillips, Stoughton, WI (US); Mark Sehmer, Stoughton, WI (US)

(73) Assignee: PROMEGA CORPORATION, Madison, WI (US)

( * ) Notice: Subject to any disclaimer, the term of this patent is extended or adjusted under 35 U.S.C. 154(b) by 0 days.

(21) Appl. No.: 14/325,921

(22) Filed: Jul. 8, 2014

(65) Prior Publication Data
US 2015/0028997 A1    Jan. 29, 2015

Related U.S. Application Data

(60) Provisional application No. 61/857,987, filed on Jul. 24, 2013.

(51) Int. Cl.
*G06K 7/10*        (2006.01)
*H04W 4/02*        (2018.01)
(Continued)

(52) U.S. Cl.
CPC ......... *G06K 7/10366* (2013.01); *G06F 21/35* (2013.01); *G06Q 10/08* (2013.01);
(Continued)

(58) Field of Classification Search
CPC ..... G06Q 10/08; G06Q 10/087; H04W 4/021; H04W 4/04; F25D 2500/06;
(Continued)

(56) References Cited

U.S. PATENT DOCUMENTS 5,822,714 A * 10/1998 Cato ............... G06K 7/10039
                                                    340/10.1
7,348,886 B2    3/2008 Kevin
(Continued)

FOREIGN PATENT DOCUMENTS

EP      2 416 298 A2    2/2012
WO    2008/033340 A2    3/2008

OTHER PUBLICATIONS

Patent Cooperation Treaty, Notification of Transmittal of the International Search Report and the Written Opinion of the International Searching Authority, or the Transmittal, in International Application No. PCT/US14/45741, dated Nov. 14, 2014 (14 pages).
(Continued)

*Primary Examiner* — Mirza Alam
(74) *Attorney, Agent, or Firm* — McAndrews, Held & Malloy, Ltd.

(57) ABSTRACT

A mobile RFID container, such as a case, cargo container, vehicle, etc., includes an RFID detector configured to conduct an RFID scan to generate scan data concerning the items carried in the mobile RFID container, and location determining circuitry for generating location data concerning the location of the mobile RFID container. A method for distributing RFID-tagged items using the mobile RFID container includes placing a plurality of RFID-tagged items in the mobile RFID container, conducting one or more RFID scans to generate scan data concerning the contents of the RFID container, and processing the scan data and location data to determine the location of the mobile RFID container at times when the contents of the RFID container have changed. The RFID scans may be performed, for example, in response to (a) sensing that the contents of the container have been accessed, (b) a request from a remote device, and/or (c) the location of the RFID container relative to
(Continued)

geofence boundary corresponding to a particular geographical location.

21 Claims, 5 Drawing Sheets (51) Int. Cl.
  H04W 4/00 (2018.01)
  G06Q 10/08 (2012.01)
  G06F 21/35 (2013.01)
  G08B 13/24 (2006.01)
  H04W 4/04 (2009.01)
(52) U.S. Cl.
  CPC ....... *G06Q 10/087* (2013.01); *G08B 13/2417* (2013.01); *H04W 4/008* (2013.01); *H04W 4/021* (2013.01); *G06F 2221/2121* (2013.01); *H04W 4/04* (2013.01)
(58) Field of Classification Search
  CPC . G06K 2017/0051; G07F 9/026; G01S 19/48; G08B 13/2462
  USPC .......... 340/8.1, 10.1, 539.1, 539.11, 539.13, 340/539.26, 568.1, 572.1, 572.4; 235/435, 487
  See application file for complete search history.

(56) References Cited

U.S. PATENT DOCUMENTS

| | | |
|---|---|---|
| 8,020,768 B2 | 9/2011 | Ramos-Elizondo |
| 8,068,023 B2 | 11/2011 | Dulin |
| 2003/0117281 A1* | 6/2003 | Sriharto ............. G08B 13/1427 340/568.1 |
| 2003/0216969 A1* | 11/2003 | Bauer .................. G06K 7/0008 705/22 |
| 2006/0022827 A1* | 2/2006 | Higham ............. G08B 13/2417 340/572.1 |
| 2007/0108273 A1* | 5/2007 | Harper ................. G06Q 10/087 235/382 |
| 2008/0030345 A1* | 2/2008 | Austin ................... A61B 90/98 340/572.8 |
| 2010/0007496 A1* | 1/2010 | Orlassino ................ H04W 4/02 340/572.1 |
| 2010/0116885 A1* | 5/2010 | Dearing ............. G06K 7/10336 235/385 |
| 2010/0265068 A1* | 10/2010 | Brackmann ............... B60P 3/03 340/572.1 |
| 2013/0106607 A1* | 5/2013 | Clement .......... G06K 19/07758 340/572.1 |

OTHER PUBLICATIONS

PCT, Notification Concerning Transmittal of International Preliminary Report on Patentability, International Application No. PCT/US2014/047608, dated Feb. 4, 2016 (10 pages).

PCT, Notification Concerning Transmittal of International Preliminary Report on Patentability, International Application No. PCT/US2014/045741, dated Feb. 4, 2016 (8 pages).

European Patent Office, Communication with extended European search report in Application No. 14829998.5, dated Jan. 18, 2017 (11 pages).

* cited by examiner

PROCESSES FOR DISTRIBUTION AND USE OF A MOBILE RFID CONTAINER

RELATED APPLICATIONS

This application claims priority to U.S. Provisional Application No. 61/857,987 filed Jul. 24, 2013, which is hereby incorporated by reference in its entirety.

BACKGROUND

The present technology relates generally to supply chain management, including the distribution, tracking, transport, storage, and inventory systems, as well as methods utilized to perform such supply chain management. Radio frequency technologies, cellular communication systems, global positioning systems, and software workflow applications involved with supply chain management are also disclosed.

Currently, in the healthcare industry, complex and expensive medical devices, such as implantable devices, and related instruments are distributed from the medical device manufacturer or distributor to the healthcare provider (e.g., hospital or surgical center). These devices are typically packaged in sterilized containers and organized, for example, by type of medical procedure and/or size. In many cases, until the medical procedure is actually in process, it is unclear from an inventory and logistics standpoint as to what exact medical device(s) and/or instrument(s), e.g., size or type, will be used in the particular procedure. Because of this, it is necessary for the medical device manufacture to provide a substantial (yet constantly changing) inventory of medical devices, e.g., various types and sizes, as well as related instruments, to the medical facility, e.g., hospital or surgical center, at a relatively short notice.

One method to accomplish this is to distribute an inventory of medical devices from the manufacturer or distribution center to the medical facility in a transportable case. These cases are stocked with items, e.g., product(s), at a manufacturer or distribution center and may sit in inventory until a specific customer or sales representative requests them for use.

For example, once there is a request for a certain devices, e.g., a set of implant/device, a case is labeled and shipped, e.g., via Fed Ex, UPS, or courier, to the medical facility, (or directly to a medical device field representative who will in turn transport it to the medical facility). Once in the medical facility, the case is opened and various devices are removed (some of which are used in a medical procedure, e.g., implanted into a patient). When the procedure is complete, the case is packaged up and returned to the medical device manufacturer or distribution center.

Currently, there is very little visibility into what inventory is actually in a case at any given time. It is only when the manufacturer or distribution center receives the case back and opens it that they actually know what items were taken or used in a given procedure. As these cases need to be quickly restocked and sent back out for use in other procedures, the manufacturer or distribution center can be caught without enough inventory of a particular device or implant type or size because they only see what has been taken and used when the case is physically (over the course of days to weeks) returned. Additionally, if a particular procedure is not performed for an extended period of time following delivery of the case to the medical facility, the associated transportable case and its expensive medical device/implant inventory cannot be further tracked and managed in a "real-time" manner. Thus, the manufacturer may end up producing a significant amount of device/implant overstock because of the poor logistical controls. Moreover, if the case is not returned to the distribution for restocking following a procedure, the case may not include the appropriate inventory for a subsequent procedure. In some instances, this out of stock condition may not be discovered until after the subsequent procedure has begun.

In addition, the physical location of each case is often unknown leading to wasted time by the medical device manufacturer and/or medical facility staff having to track down each case. In many instances, the medical device manufacturer has to stock additional devices and cases to offset unaccounted for cases in the field too.

Furthermore, the medical device manufacture cannot invoice the customer until it confirms what has been used in a particular procedure. At times, the case will not be returned to the manufacturer or distribution center for days after a procedure, which can lead to billing delays and inaccuracies.

SUMMARY

At least some embodiments of the present technology depicted herein relate to a transportable container enabled with radio frequency identification ("RFID") technology to maintain automated and "real time" inventory levels of the items that are inside the container. In some embodiments, the transportable container may, for example, be in the form of mobile case that is sized and configured to be transported, e.g., carried, by a person. In other embodiments, the container may, for example, be a cargo or shipping container, a rail car, a vehicle, etc.

The container may also include a location device for determining the location of the container and its associated cargo. For example, the container may utilize cellular triangulation and/or global positioning system ("GPS") technology for determining the location of the container. The container may also include a power source, such as rechargeable battery power, for the electronics.

In some embodiments, the container may include additional sensors for monitoring environmental conditions, such as temperature, humidity, pressure, acceleration, etc., of the interior compartment and/or the ambient conditions surrounding the container. Similarly, the container may be equipped with impact sensor(s), accelerometer(s) or similar technology for gathering data regarding impacts or other adverse forces that the container is exposed to, e.g., for introducing accountability and oversight into the shipping and handling stages of the supply chain.

The container may include a controller coupled to the sensors and configured to transmit data gathered by these sensors to a remote device. In some embodiments, the controller may be configured to transmit such data at predetermined time intervals and/or in response to predetermined events or conditions. For example, if the controller detects an event that could adversely affect the items, such as an excessive impact or adverse temperature condition, the controller may be configured to automatically transmit the relevant data to the remote device.

In addition, the mobile RFID container may include one or more visual and/or audible indicators that may be activated in response to the data collected from the sensors. For example, the container may include a visual indicator, such as a light, display screen, etc., that may be used to provide messages and/or alerts in response to the data collected from the various sensors. The container may also include a device such as a speaker for providing audible alerts and/or messages in response to the data collected from the various sensors.

The mobile RFID container may also include a communication interface configured to transmit data to the remote device. In some embodiments, the communication interface may be a wireless communication interface and may include, for example, one or more of a cellular interface, a Wi-Fi interface or a Bluetooth interface. Data, such as scan (i.e., RFID tag data), location, sensed parameter and/or time code data may be communicated to a remote device such as an enterprise resource planning ("ERP") system, website, server, personal computer, etc. The remote device may use the data received from the transportable container to automatically update and generate appropriate records (e.g., container inventory, restocking, invoicing, location tracking, breakage, tampering, container conditions, open and close events, etc.).

The mobile RFID container may further include radio frequency, ("RF") shielding to prevent the RFID scans from reading RFID tags located outside of the container. In some embodiments, the RF shielding may include one or more layers of RF blocking material that surrounds or lines the interior compartment. In some embodiments, the layer of RF blocking material comprises at least one of metal or metalized plastic. In some embodiments, the layer of RF blocking material comprises one of a sheet metal, a metal screen, or a metal foam. However, it should be appreciated that the RF shielding aspects and embodiments of the present technology may comprise any one or more suitable shielding materials beyond the ones noted here. If the material(s) can function as an RF shielding material, it/they are contemplated for use in accordance with the present technology and appended claims. In some embodiments, such RF shielding material may not be needed depending on antenna selection and/or RF power settings, for example.

In certain embodiments, the RFID tagged items carried in the mobile RFID container may be one or more pharmaceuticals, biologics, medical devices, and/or medical instruments. The scan data may include, for example, one or more of an EPC code, a TID code, a serial number, a product description, a date, and a lot number (among others).

In some embodiments, the mobile RFID container may include a system for limiting and/or tracking access to the container. For example, in some embodiments, the mobile RFID container may include a locking mechanism and an identification sensor, such as a badge or card reader. A controller may be coupled to the identification sensor and locking mechanism and configured to track and/or restrict access to the container. For example, in some embodiments, the controller may be configured to record identity information regarding individuals who attempt to access contents of the container via the identification sensor and transmit such data to the remote device.

Certain embodiments of the present technology relate to methods for distributing RFID-tagged items using mobile RFID containers as described above. The methods may be used with a variety of types of mobile RFID containers, including, for example, mobile cases, rail cars, shipping/cargo containers, and vehicles.

In some embodiments, the method may include placing a plurality of RFID-tagged items in a mobile RFID container, conducting one or more RFID scans to generate scan data concerning the contents of the RFID container, and processing the scan data and location data to determine the location of the mobile RFID container at times when the contents of the RFID container have changed. The method may also include generating inventory data, invoicing data, credit data, and/or restocking data based on the scan and location data. In some embodiments, the scan and location data is transmitted to a remote device, which in turn processes the scan and location data to generate the inventory, invoicing, credit and/or restocking data. It should be appreciated by those skilled in the art that a variety of types of reports may be generated (e.g., time/date status report, location report, tamper event report, location report, external/internal container conditions report, content conditions report, among others). The method may also include transporting the mobile RFID container from a first location to a second location that is geographically remote from the first location. The first and second locations may, for example, be end user facilities and/or restocking facilities, such as distribution centers. In some embodiments, restocking is based on scan data transmitted by the mobile RFID container prior to the mobile RFID container reaching a restocking facility. Thus, at least some advantage of the present technology relate to real-time use and contents tracking and inventory management which in turn enhances billing and invoicing timing, efficiency and/or accuracy.

In some embodiments, the location data may be determined using multilateration of radio signals and/or global positioning. In some embodiments, the RFID scans may be conducted in response to one or more of the following: the location of the container relative to a defined geographical location, determining that the contents of the container have been accessed, and/or receiving a request from a remote device.

Some embodiments may also include monitoring parameters such as, for example, temperature, humidity, acceleration, pressure, and/or battery level, and responsively generating monitored condition data indicative thereof. Such methods may also include processing the monitored condition data and location data to determine the location of the mobile RFID container at times when the monitored condition data is generated.

Methods according to some embodiments may include defining at least one geofence boundary corresponding to a particular geographical location, monitoring the location of the mobile RFID container and performing at least one automated processes in response to the location of the mobile RFID container relative to the at least one geofence boundary. One or more automated processes may, for example, be performed upon one or more of the following events: the container being within a predetermined distance of a geofence boundary, the container entering a geofence boundary, the container being within a geofence boundary, or the container exiting a geofence boundary. In some embodiments, a plurality of geofence boundaries may be defined. In some embodiments, the automated process may include, for example, conducting at least one RFID scan to generate scan data concerning the contents of the RFID container, generating a restocking order to have one or more items added to the RFID container, generating an invoice, updating software of the RFID container; updating firmware of the RFID container, or monitoring at least one parameter of the mobile RFID container. Some methods may include processing the RFID scan data to determine if the contents of the RFID container changed while the container was within a geofence boundary. In some embodiments, one or more geofence boundaries may be used that correspond, for example, to customer facilities (such as a surgical centers or offices) and/or restocking facilities (such as distribution warehouses).

In one embodiment, a mobile RFID container may be stocked with RFID tags at a first geographic location, such as a distribution warehouse. After the container is stocked, one or more RFID scans may be conducted to generate scan data concerning the contents of the mobile RFID container. The mobile RFID container may then be transported to a second geographic location, such as to a customer, that is remote from the first geographic location. Following the transporting step, one or more additional RFID scans may be conducted to generate scan data concerning the contents of the mobile RFID container. The scan data may then be processed to determine if the contents of the mobile RFID container have changed while the mobile RFID container is at the second geographic location. The RFID scans may be conducted in response to one or more of the following: determining the location of the container relative to the first and second geographic locations, determining that the contents of the container have been accessed, or receiving a request from a remote device. Some embodiments may include defining first and second geofence boundaries that correspond, respectively, to the first and second geographic location. Such methods may include conducting RFID scans in response to the mobile RFID container being within, entering and/or leaving the first and/or second first geofence boundaries.

DETAILED DESCRIPTION

Figure 1:
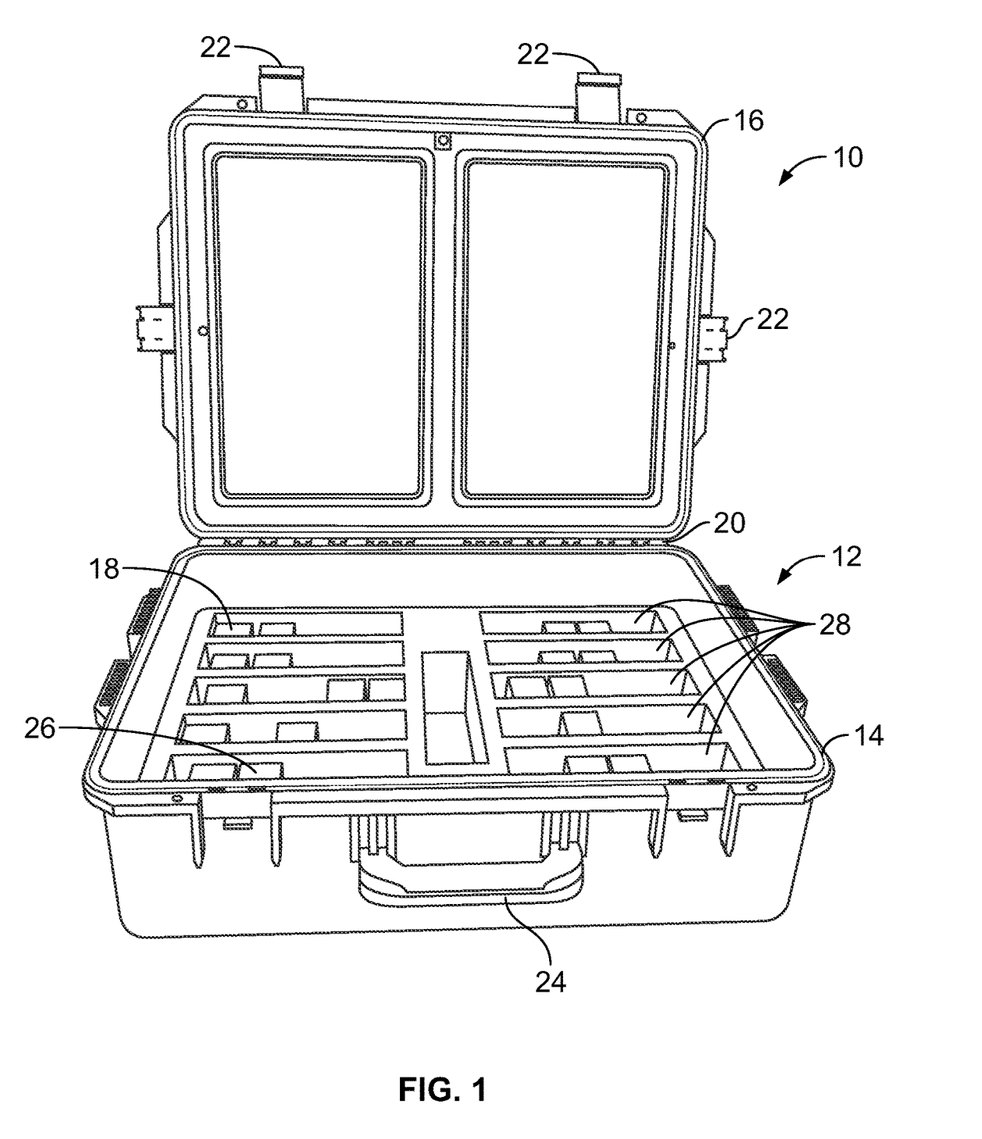
FIG. 1 is a perspective view of a mobile RFID container according to an exemplary embodiment of the present technology.

FIG. 1 illustrates a mobile (i.e., transportable or movable) RFID container 10 according to certain embodiments of the present technology. In the embodiment of FIG. 1, the mobile RFID container 10 is in the form of a case that is sized and configured to be transported, e.g., carried, by an individual. It will be appreciated, however, that the container can take numerous other forms, such as, for example, a rail car, a cargo container, a shipping container, or a vehicle, for example.

In the illustrated embodiment, container 10 includes a housing 12 having a main body 14 and a door 16. The main body 14 and the door 16 cooperate to define an interior compartment 18. The door 16 is movable relative to the main body between an open position to provide access to the interior compartment 18 and a closed position to prevent access to the interior compartment. In the illustrated embodiment, the door 16 is movably connected to the main body by a hinge mechanism 20. Alternatively, the door 16 may be removable from the main body in order to provide access to the interior compartment. The housing 12 may include one or more latches 22 for securing the door 16 in its closed position. The housing 12 may also include one or more handles 24.

The interior compartment 18 is configured to house a plurality of items 26. In this regard, the interior compartment 18 may include a plurality of sub-compartments 28, each of which is configured to house one or more individual items. By way of example, the items 26 may include pharmaceuticals, biologics, medical devices, such as implants, and/or related medical instruments, e.g., surgical instruments. Each item (or its packaging) may include one or more RFID tags 30 (see FIG. 2) encoded with descriptive information for the respective item, such as an EPC code, a TID code, a serial number, a product type, a date, a lot number, and similar information, or a unique ID, among other information which can correspond to information in a database on a server. The sub-compartments 28 may be defined by a substantially RF transparent material, such as hard foam; plastic or rigid cardboard.

Figure 2:
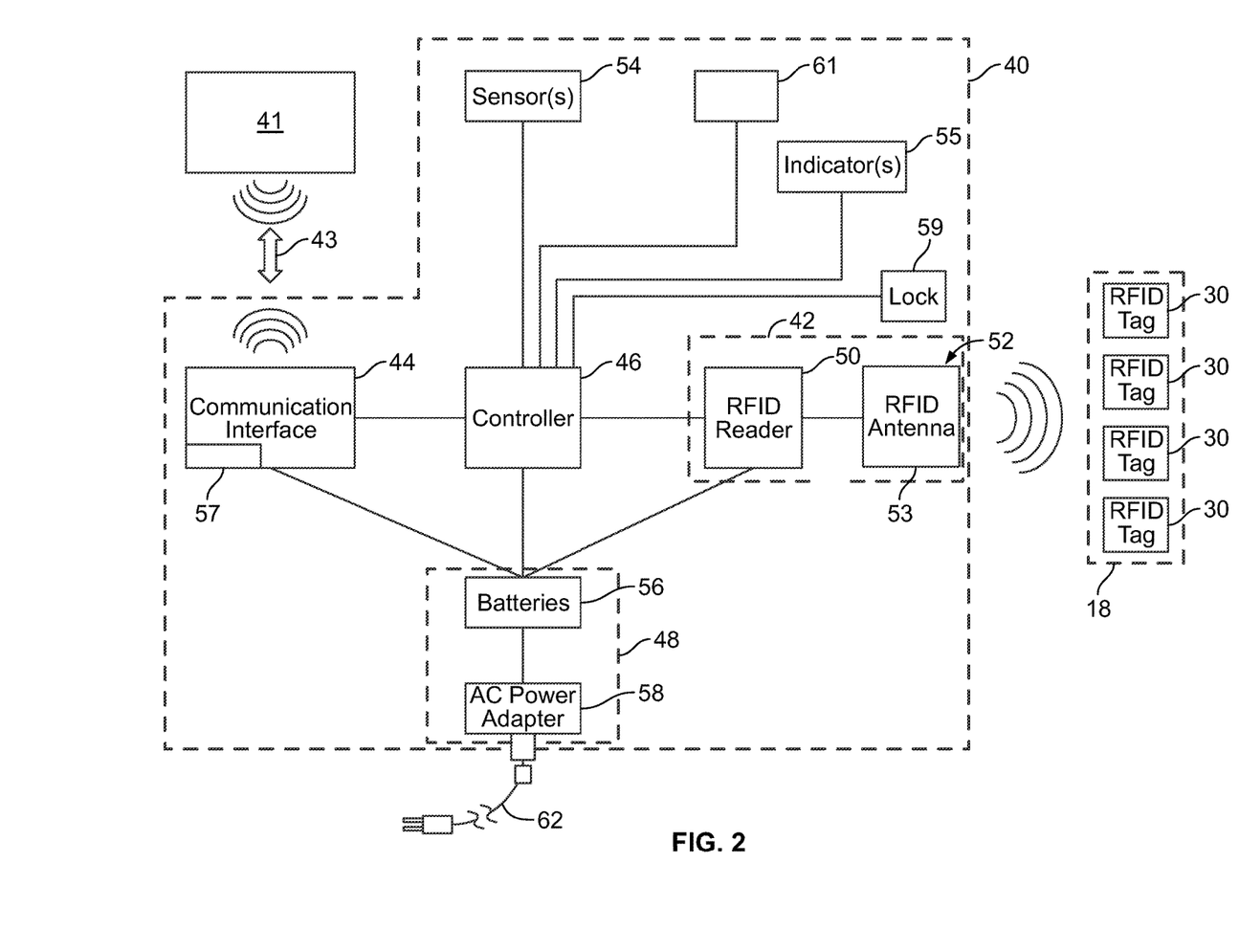
FIG. 2 is a schematic of a control system used in the mobile RFID container of FIG. 1.

Referring additionally to FIG. 2, the mobile RFID container 10 may also include at least one control system 40 for collecting data regarding the RFID-tagged items within the container and transmitting that data to a remote device 41 over a network 43. Transmissions between the mobile RFID container 10 and the remote device may be conducted using standard protocols such as TCP/IP, UDP, or other protocols. The network 43 may be the Internet, a telephone network, a wireless network, power line carrier ("PLC") network, or other type of network and combinations thereof. In some embodiments, the remote device 41 may be an enterprise resource planning ("ERP") system, website, server, personal computer, etc. In some embodiments, the remote device may include multiple servers and databases and be constructed in accordance with certain aspects of the systems described in U.S. Pat. Nos. 8,025,228 and/or 7,258,276, the disclosures of which are hereby incorporated by reference.

The control system includes an RFID detector 42, a communications interface 44, a controller 46 and a power source 48. The RFID detector 42 may be configured to conduct RFID scans of the interior compartment 18 and collect scan data concerning the RFID-tagged items 26 contained within the compartment. The RFID detector 42 may include at least one RFID reader 50 interconnected with at least one RFID antenna mechanism 52. In some embodiments, the RFID antenna mechanism 52 may include a plurality of antennas 53. The RFID tags 30 may be passive or active. In the container of passive tags, the RFID reader 50 may be operable to activate the antenna mechanism 52 such that the antenna mechanism emits at least one signal at a predefined frequency and generates an electromagnetic field sufficient to permeate the entire interior compartment. An RFID reader that is suitable for use in at least some embodiments is Indy RS500 reader module, which is available from Impinj, Inc. Another suitable RFID reader for at least some embodiments is an Impinj Speedway Revolution.

The communications interface 44 may be a wireless communications interface and may include one or more of a cellular interface, a Wi-Fi interface or a Bluetooth interface, for example. A wireless communications interface suitable for use in at least some embodiments of the present technology is a Sierra MC7354 with SIM card provided by a carrier such as Sprint, Verizon or AT&T, which are available from commercial sources. Alternatively or additionally, the communications interface 44 may include a wired network interface, such as an Ethernet NIC, for example.

The controller 46 is communicatively coupled to the RFID detector 42 and the communications interface 44, e.g., via UART or other suitable connections. A suitable controller for use in at least some embodiments of the present technology is a Texas Instruments Sitara ARM embedded processor which is available from commercial sources. The controller 46 may be configured to trigger RFID scans via the RFID detector 42 and to transmit scan data to the remote device 41 via the communications interface 44. In some embodiments, the controller 46 may transmit the scan data to the remote device 41 each time an RFID scan is performed. In some embodiments, the controller may be configured to trigger one or more RFID scans in to a scan request received from the remote device 41. In some embodiments, the controller may be configured to trigger multiple scans. For example, the controller may run a plurality of scans in order to ensure a predetermined integrity level of the scan data in the manner described in the aforementioned U.S. Pat. No. 8,025,288.

The control system 40 may also include one or more sensors 54 for detecting parameters relative to the mobile RFID container. For example, in some embodiments, the sensor(s) 54 may include a door sensor for detecting the position and/or movement of the door 16 and transmitting at least one signal indicative thereof. For example, the door sensor may be a proximity sensor that is configured to provide information regarding whether the door 16 is opened or closed. A sensor that is suitable for use in at least some embodiments is Omron Automation 3-wire E2E-X1R5E1 proximity sensor, which is available from commercial sources. As discussed below, the door sensor may be used to determine if the contents of the container have been accessed. As will be appreciated, a variety of other sensors, such as motion sensors, may alternatively or additionally be used to facilitate this function. For example, when the container is in the form of a truck or shipping container, a motion detection sensor may be provided to detect when individuals enter or exit the container.

In some embodiments, the sensors(s) 54 may include one or more sensors for monitoring environmental conditions, such as temperature, humidity, atmospheric pressure, etc., of the internal compartment and/or the ambient conditions surrounding the mobile RFID container 10. Similarly, in some embodiments, the sensor(s) 54 may include one or more impact sensors or similar technology for gathering data regarding impacts and/or other adverse forces that the mobile RFID container is exposed to.

The controller 46 may be operatively coupled to the sensor(s) 54 and configured collect data from the sensor(s). In some embodiments, the controller 46 may be configured to perform additional actions, such as triggering one or more RFID scans, in response to the sensor data. For example, in embodiments where the sensor(s) 54 include a door sensor, the controller 46 may be configured to trigger one or more RFID scans in response to a door sensor indicating the door has been closed. In some embodiments the controller may be configured to trigger scans when sensor data meets a predetermined condition, such as a predetermined temperature or humidity condition.

The control system 40 may also include at least one location device 57 for generating location data indicative of the location of the mobile RFID container 10 (as well as its contents). In some embodiments, the location device may use GPS technology and/or cellular technology, e.g., via multilateration of radio signals between radio towers. The location device 57 may be configured to interact with the communications interface 44 to transmit location data directly to the remote device 41, e.g., via a cellular network. Alternatively or additionally, the location device may transmit the location data to the controller 46, and the controller 46 may, in turn, be configured to transmit the location data to the remote device 41 via the communications interface 44. A location device suitable for use in at least some embodiments of the present technology may be embedded in the cellular data card of the wireless communications interface discussed above.

The controller 46 may be configured to store the scan data, sensor data and/or location data in memory carried by the container 10. The controller 46 may further be configured to transmit the scan data and/or sensor data to a remote device. For example, in some embodiments, the controller 46 may be configured to transmit the scan data and/or sensor data at predetermined time intervals and/or in response to predetermined events or conditions. In this regard, the controller may automatically transmit scan data each time a scan occurs, e.g., in response to the container being accessed. The controller 46 may also be configured to transmit data if the controller detects an event that could adversely affect the RFID-tagged items, such as an excessive impact or adverse temperature condition.

In addition, the mobile RFID container 10 may include one or more indicators 55, which can be activated, e.g., by the controller 46 in response to the data collected from the sensor(s) 54 and/or other conditions or parameters. For example, in some embodiments, the indicators 55 may include a visual indicator, such as a light or display screen, that can be activated by the controller to provide alerts and/or messages. In some embodiments, the indicators 55 may also include an audible indicator, such as a speaker, that can be activated by the controller 46 to provide alerts and/or messages. For example, the indicator(s) may be used to provide messages/alerts concerning the conditions of the container and/or its contents. Examples include messages concerning power status, charging status, scanning status, e.g., scan in progress, temperature inside container, critical temperature exceeded, alters concerning potential damage to items, e.g., resulting from excess temperature, excess impact, or any other desirable information.

The mobile RFID container 10 may include RFID shielding or a portion thereof configured to prevent the RFID detector from reading RFID tags located outside of the container. In this regard, the housing may be constructed of at least one suitable RF blocking material known in the art. Alternatively or additionally, the mobile RFID container 10 may include at least one layer of RFID blocking material that surrounds, encompasses lines or interacts with the interior compartment. Suitable RF blocking materials include, for example, a metal, such as copper, aluminum foil, a spray on metallic paint or a metalized plastic. In some embodiments, the layers of RF blocking material may be, for example, a sheet metal, a metal screen, and/or metal foam. Alternatively or additionally, a near field (NF) antenna could be employed to limit read distance to inside container 10. The RF signal from RFID reader 50 to RFID antenna 53 could also be tuned to prevent reading of tags outside of the container.

As noted above, a power source 48 is provided for powering the various components of the control system 40. The power source 48 may, for example, include one or more rechargeable batteries 56. The batteries 56 may be removable for charging using an external battery charger, not shown. Alternatively or additionally, the container may include contacts (not shown) for slide-in self-charging or an inductive (contactless) mat charging interface. Alternatively, in some embodiments, the power source 48 may include an AC power adapter 58 configured to power at least one charging circuit (not shown) for charging the batteries, collectively or individually. The AC power adapter 58 may also be configured to directly power the control system components, including while the batteries are being recharged. Electrical power may be delivered to the AC power adapter 58 from an external source. In this regard, a power cord 62 may be used to interconnect the AC power adapter 58 to an external power source. The cord 62 may be configured for connection to an electrical outlet or other power source such as a cigarette lighter in a vehicle. The power cord 62 may be detachable from the AC power adapter 58 so it can be stored when not in use.

The control system 40 may be configured to run in a sleep state to preserve the batteries. For example, the control system 40 may be configured to transition to the sleep state in response to the door 16 being closed for a predetermined amount of time, such as 5 minutes for example. The control system 40 may be configured to "awaken" to full power operation in response to a predetermined event or condition. For example, when the control system includes a door sensor, the control system may be configured to awaken in response to the door 16 being opened or opened/closed, for example. The control system may further be configured, for example, to perform one or many RFID scans and/or transmit data to the remote device in response to being awakened, e.g., following the door 16 being opening and closed. Alternatively or additionally, the control system 40 may be configured to wake up on regular intervals and perform scans and/or transmit data. For example, the control system may be configured to awaken at regular intervals and transmit location data to the remote device for tracking purposes.

In some embodiments, the mobile RFID container 10 may include a system for limiting and/or tracking access to the container. For example, in some embodiments, the mobile RFID container 10 may include a locking mechanism 59 for restricting access to the container. In addition, an identification sensor 61, such as a badge/card reader, finger print reader or similar device may be provided. The controller 46 may be configured to control the locking mechanism 59 in response to data collected from the identification sensor 61 indicating that an entity, e.g., person or business, is (or is not) authorized to access the contents of the container 10. The controller 46 may further be configured to transmit data gathered from the identification sensor 61 to a remote device. For example, in some embodiments, the controller may be configured to record identity information regarding entities who attempt to access contents of the container via the identification sensor and transmit such data (alone or with other data such as contemporaneous scan and/or parameter data) to the remote device.

Figure 3:
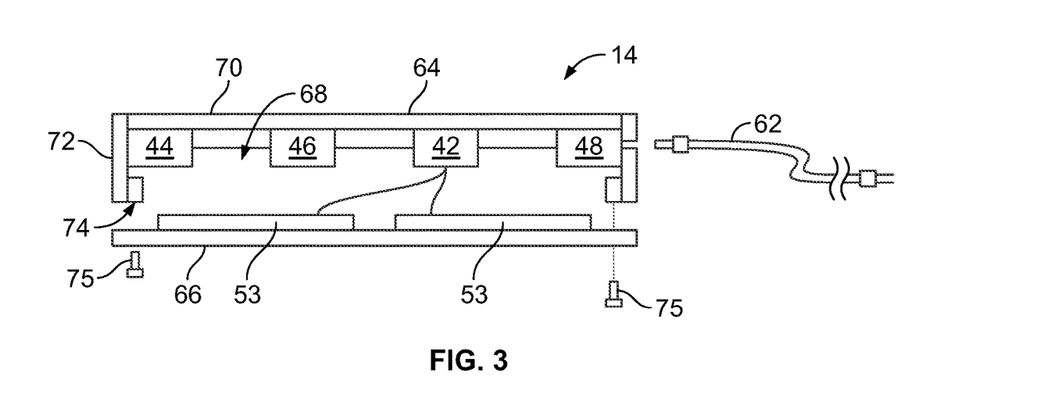
FIG. 3 is an exploded cross-sectional view of the body of the mobile RFID container of FIG. 1.

As shown in FIG. 3, the body 14 of the container 10 may comprise first and second portions 64 and 66 that cooperate to define a compartment 68 for housing at least some of the control system components 40. In the illustrated embodiment, the body first portion 64 may be generally box-shaped and includes a back wall 70 and a side wall 72 extending from the edges of the back wall. It is envisaged that other shapes (rectangular, oval, circular, etc.) can be utilized. The body first portion 64 defines a front opening 74 that provides access to the compartment 68. The body second portion 66 may be in the form of a flat panel that mates with the front opening 74 to close off the compartment 68. Fasteners 75, such as screws, may be used to secure the first and second door portions 64 and 66 to each other. Some or all of the control system components may be mounted on the door 16. In some embodiments, one or more of the RFID detector 42, controller 46, communications interface 44, location device 56 and/or power source 48 may be mounted on, within or in communication with the compartment 68. In some embodiments, some or all of these components may be mounted on a single circuit board. Further, in other embodiments, the antenna(s) 53 may be mounted on the body second portion 66. Alternatively, the antenna(s) 53 may be mounted on the door 16 so that the antenna(s) face the interior compartment 18 when the door is in its closed position.

Figure 4:
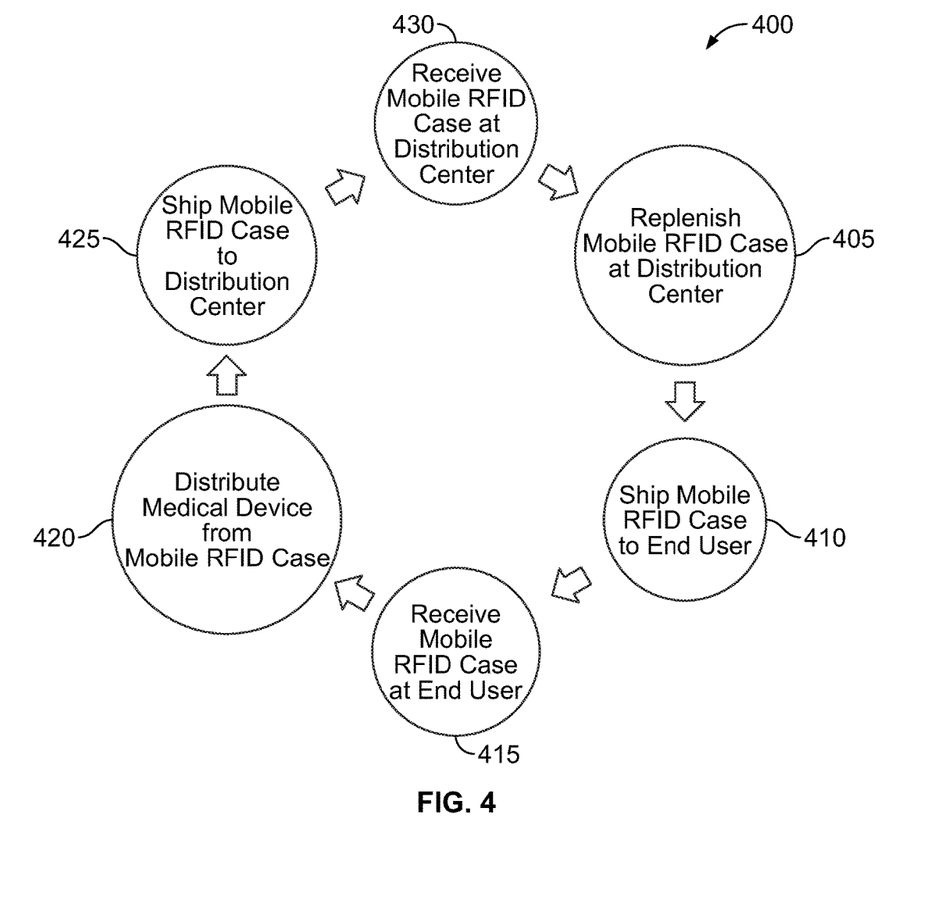
FIGS. 4 and 5 are flow diagrams illustrating a medical device distribution process according to certain embodiments of the present technology.
Figure 5:
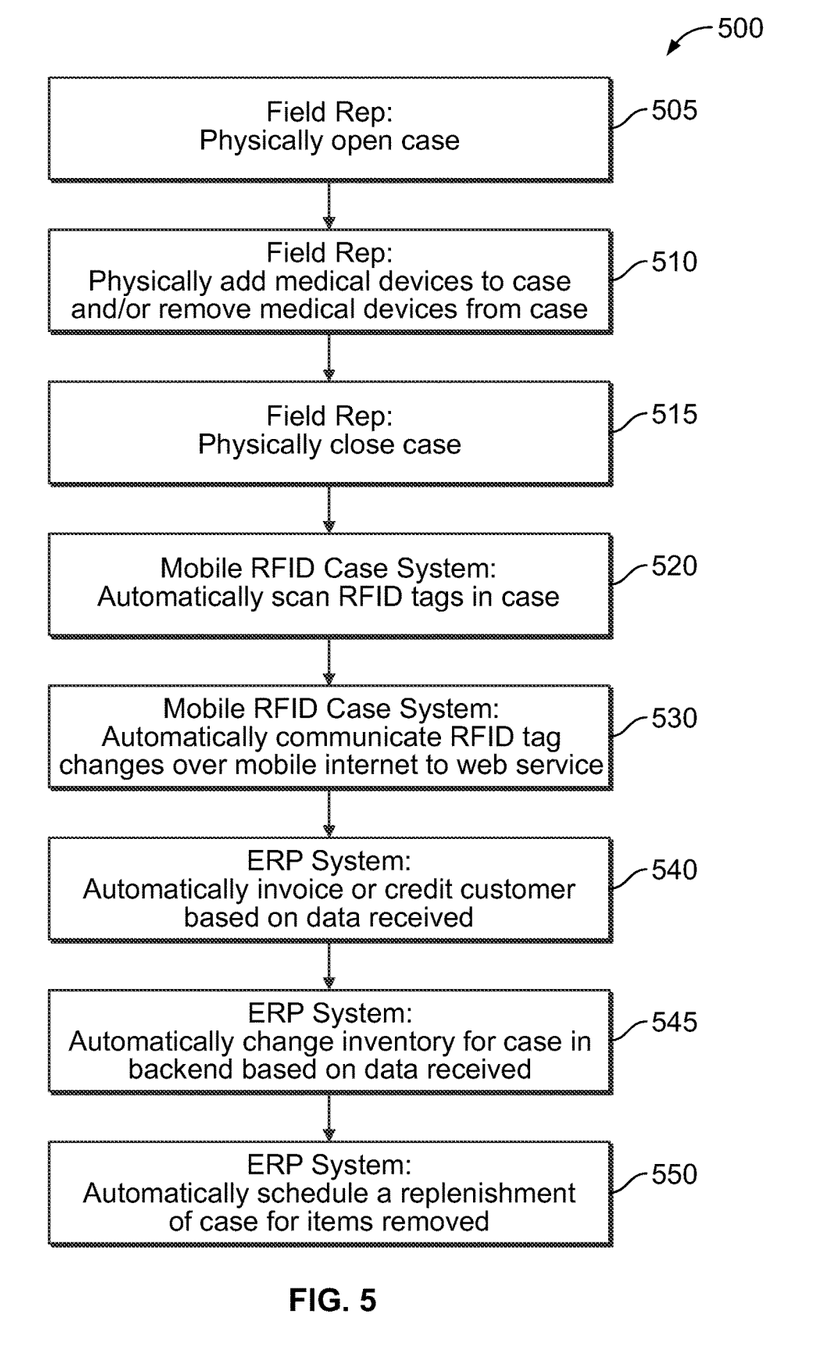

FIGS. 4 and 5 are flow diagrams illustrating an exemplary medical device distribution process according to at least one embodiment of the present technology. The distribution process 400 begins in step 405 where the mobile RFID container 10 is stocked with items at a distribution center. For example, in the context of a medical procedure, the container may be stocked with medical devices of varying sizes and configuration as well as one or more surgical tools that can be used to implant the devices during surgery. After the mobile RFID container 10 is stocked with the appropriate items, it is closed. At this time, the mobile RFID container 10 may conduct a scan, e.g., in response to sensing door closure via the door sensor, and transmit the scan data to the remote device, e.g., an ERP system. At the same time, the mobile RFID container 10 may transmit location data that can be used to correlate the location of the container and its current inventory. For example, the RFID scan data and location data can be used to update inventory data for the mobile RFID container 10. The inventory data may reflect, for example, the time, date, location and contents of the container as well as any other data as may be desirable for the given application. In some embodiments, some or all of the control system components may be carried by the container door 16.

Once the mobile RFID container 10 is stocked with the appropriate item(s), it is shipped from the distribution center to the end user. (Step 410) In the context of a medical procedure, the end user may be a hospital or surgical center, for example. The mobile RFID container 10 can be shipped via a common carrier, such as Federal Express or UPS, for example. Alternatively, the mobile RFID container 10 may be transported to the end user by a field representative, as is common in the medical device industry.

Once at the end user (Step 415), the mobile RFID container 10 may be used to distribute the RFID-tagged items. (Step 420) By way of example, the mobile RFID container 10 may be brought into the surgical suite by the field rep and used to distribute appropriate items, e.g., implants and/or tools, to the medical staff during a surgical procedure. FIG. 5 is a flow diagram illustrating certain aspects of an exemplary process for distributing items from the mobile RFID container during a surgical procedure. In step 505, the mobile RFID container 10 is opened. For example, the field representative may open the mobile RFID container at the beginning of the surgical procedure or at such time as may be deemed appropriate. Next, in step 510, one or more items are removed from (and/or added) to the container during the medical procedure. For example, several devices, e.g., implants of varying size, may be removed from the box. During medical procedure, the appropriate device(s) may be implanted and the unused devices may be returned to or left in the container. While the container 10 is at the end user, it may perform one or more RFID scans to collect scan data (i.e., RFID tag data) concerning its contents. For example, an RFID scan may be automatically triggered when the door is closed following the medical procedure. (Steps 515 & 520).

The scan data is then transmitted (Step 530) to the remote device 41 where it can be used to generate and/or update appropriate records (e.g., container inventory, discrepancies, locations, restocking, invoicing, other recordable events, etc.). (See, e.g., Steps 540-550). The mobile RFID container 10 may also transmit location data with the scan data to allow the remote device to coordinate the current inventory of the mobile RFID container with its location. For example, the data may be used to determine what items were used during the surgery for invoicing purposes.

As noted above, the remote device 41 may, for example, include an ERP system operating on one or more servers. As indicated in steps 540, the ERP system may be configured to automatically invoice or credit customers based on the data received from the RFID container. Similarly, in step 545, the ERP system may be configured to update appropriate inventory records for the specific container based on the data received from the mobile RFID container. Further, in step 550, the ERP system may be configured to automatically schedule replenishment/restocking of the container based on the data received from the mobile RFID container.

Returning to FIG. 4, once the medical procedure is completed, the mobile RFID container 10 may be returned to the manufacture or distribution center. (Steps 425, 430). Once at the manufacture or distribution center, the mobile RFID container 10 may be restocked with the appropriate item(s). (Step 405). Advantageously, the scan data is automatically transmitted to the remote device 41 when the door 16 of the mobile RFID container 10 is closed following the medical procedure. As a result, the appropriate invoicing, inventory and restocking records can be generated before the mobile RFID container 10 is received at the manufacturer or distribution center. Thus, the invoicing process can be expedited, and the manufacturer or distribution center can take steps to ensure that the appropriate items are in inventory for restocking the mobile RFID container 10 upon its receipt at the manufacturer or distribution center.

Figure 6:
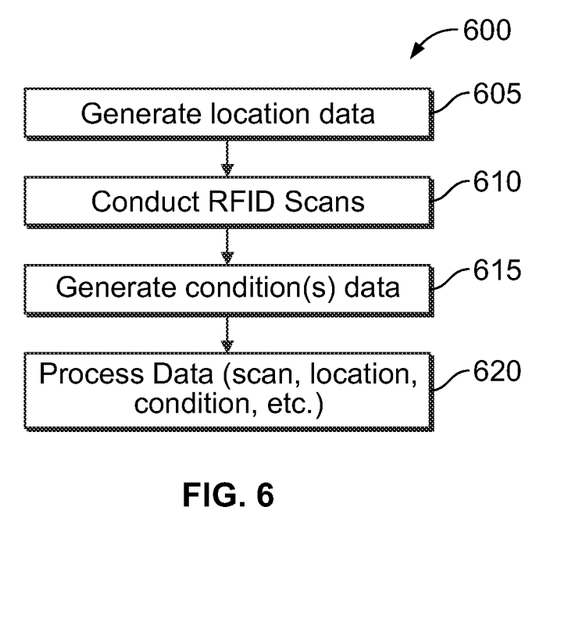
FIG. 6 is a flow diagram illustrating a distribution process according to certain embodiments of the present technology.

FIG. 6 illustrates another exemplary method for distributing RFID-tagged items using a mobile RFID container as described above. The method may include generating location data indicative of the location the RFID container. (Step 605). The method also includes conducting one or more RFID scans to generate scan data concerning the contents of the RFID container. (Step 610). In some embodiments, the method may include monitoring one or more conditions and generating condition data. (Step 615). For example, the method may include monitoring one or more of the temperature of the interior compartment, the relative humidity of the interior of the compartment, and/or an acceleration of the mobile RFID container and generating monitored condition data indicative thereof. The method may further include the step 620 of processing the data from one or more of steps 605-615. According to at least some embodiments, the processing step 620 may include processing the scan and location data to determine the location of the mobile RFID container at times when the contents of the RFID container have changed. The processing step may also include processing the monitored condition data and location data to determine the location of the mobile RFID container at times when the monitored condition data is generated.

In some embodiments, the RFID scans may be automatically performed when the door of the RFID container 10 is moved to its closed position. In some embodiments, the RFID scans may be conducted in response to a request from a remote device.

In some embodiments, the method may include defining one or more geofence boundaries that correspond to particular geographical location(s). In such a method, one or more RFID scans may also be performed in response to the location of the RFID container relative to the geofence boundaries. For example, one or more RFID scans may be performed upon detecting one or more of the following events/conditions: the container being within a predetermined distance of a geofence boundary, the container entering a geofence boundary, the container being within a geofence boundary, or the container exiting a geofence boundary. RFID scans may be conducted when the container is within, enters and/or leaves the geofence boundary to generate scan data concerning the contents of the RFID container. The processing step may include processing the scan and location data to determine if the contents of the RFID container changed while the container was within a particular geofence boundary. For example, with reference to FIG. 7, a geofence boundary 705 may be defined to correspond to the geographic location of a distribution warehouse 710 where the container 10 is stocked with inventory. Additional geofence boundaries may be defined which correspond to the geographic locations of end-user/customer facilities. In the illustrated embodiment of FIG. 7, geofence boundaries 712 and 715 are defined to correspond to customer facilities 720 and 725, respectively. As will be appreciated, the number and types of geofence boundaries may vary according to the specific application. Further, while the geofences are illustrated as being circular, they can take a variety of shapes (square, rectangular, irregular, etc.) to adapt to the needs of the particular situation.

Figure 7:
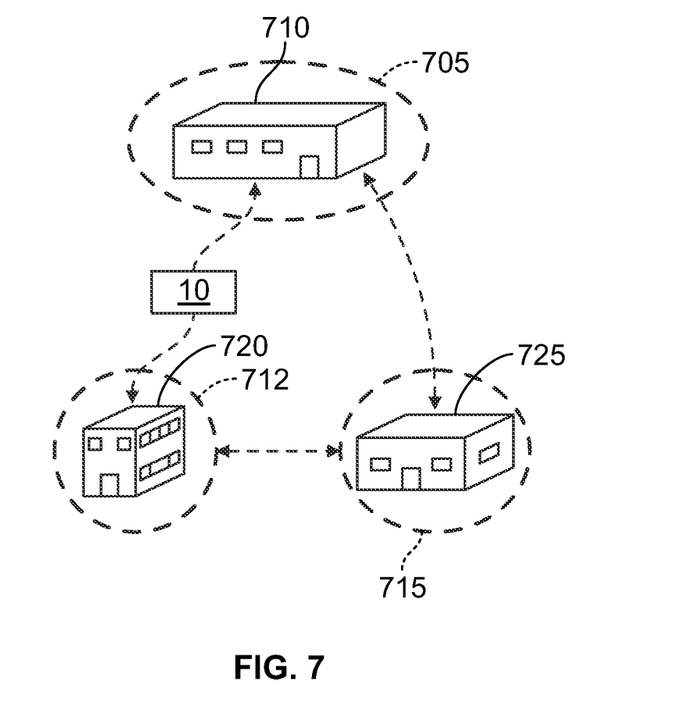
FIG. 7 further illustrates the use of geo-fencing according to certain embodiments of the present technology.

The location and scan data may be processed (in step 620) to determine if the contents (i.e. inventory) of the container changed while the container 10 was at a particular location, e.g., warehouse or customer, as defined by the respective geofence boundary. For example, a first RFID scan may be conducted upon detecting that the container 10 has entered the geofence boundary 712 corresponding customer facility 720, and a second RFID scan may be conducted upon detecting that the container has left the geofence boundary 712. The data from the first and second RFID scans may be processed to determine if the inventory of the container changed, e.g., if items were removed, while the container was at the customer facility 720. This inventory data can in turn be used for a variety of purpose including customer invoicing and generating restocking orders for the container.

In some embodiments, the method 600 may include performing one or more automated processes in response to the location of the mobile RFID container relative to at least one geofence boundary. For example, one or more automated processes may be performed upon one or more of the following events: the container being within a predetermined distance of a geofence boundary, the container entering a geofence boundary, the container being within a geofence boundary, or the container exiting a geofence boundary. Exemplary automated processes may include, for example, conducting at least one RFID scan to generate scan data concerning the contents of the RFID container, generating a restocking order to have one or more items added to the RFID container, generating an invoice, updating software of the RFID container, updating firmware of the RFID container, or monitoring at least one parameter of the mobile RFID container. Exemplary parameters that may be monitored include temperature, humidity, acceleration, pressure, and/or battery level.

The processing step 620 may further comprise generating inventory, invoicing and/or credit data based on the scan data and/or location data. However, it should be appreciated by those skilled in the art that a variety of types of reports may be generated (e.g., time/date status report, location report, tamper event report, external/internal container conditions report, content conditions report, among others). In some embodiments, the inventory, invoicing and/or credit data, for example, may be generated by the remote device.

FIG. 7 illustrates certain aspects of an embodiment of a distribution process that utilizes geofencing. By way of example, the container 10 may initially be located at the distribution warehouse 710 where it is stocked with an inventory of RFID tagged items. For example, in the context of a medical procedure, the container 10 may be stocked with medical devices of varying sizes and configuration as well as one or more surgical tools that can be used to implant the devices during surgery. After the mobile RFID container 10 is stocked with the appropriate items, it is closed. At this time, the mobile RFID container 10 may conduct a scan, e.g., in response to sensing door closure via the door sensor, and transmit the scan data to the remote device 41. At the same time, the mobile RFID container 10 may transmit location data that can be used to correlate the location of the container and its current inventory, as well as parameter data as discussed above. The RFID scan data and location data can be used, e.g., by the remote device 41, to update inventory data for the mobile RFID container 10. The inventory data may reflect, for example, the time, date, location and contents of the container 10 as well as any other data as may be desirable for the given application.

Once the mobile RFID container 10 is stocked with the appropriate item(s), it may be shipped from the distribution warehouse 710 to an end-user, such as customer location 720. An RFID scan may be triggered in response to the container 10 exiting the geofence 705 corresponding to the distribution warehouse 710. The results from the RFID scan (as well as location and/or parameter data) may be transmitted to the remote device for determining the inventory (and/or monitored conditions) of the container 10 at the time it exited the distribution warehouse. As the container 10 is in transit to the customer location 10, the container 10 can conduct RFID scans, as well as monitor parameters, such as temperature, humidity, acceleration, pressure, and/or battery level, for example. The RFID scan, location and/or parameter data may be transmitted to the remote device 41, e.g., via a cellular network.

Another RFID scan may be triggered when the container 10 enters the geofence 712 corresponding to the customer facility 720. At the same time, the container 10 may record parameter data as discussed above. The results from the RFID scan (as well as location and/or parameter data) may be transmitted to the remote device 41 for determining the inventory (and/or monitored conditions) of the container 10 at the time it arrived at the customer facility 720. While at the customer facility, the container may be accessed, e.g., by the customer or manufacturer's representative. Upon closure of the container 10, an RFID scan may be triggered and the scan data (and any other pertinent data) may be transmitted to the remote device 41. An additional RFID scan may be triggered when the container 10 exits the geofence 712 corresponding to the customer facility 720. The RFID scan data, as well as any pertinent parameter and location data may be transmitted to the remote device 41. As will be appreciated, the above discussion is applicable to other geofenced locations, such as the customer facility 725.

The remote device 41 can use the scan, location and parameter data to generate and/or update appropriate records (e.g., container inventory, discrepancies, locations, restocking, invoicing, other recordable events, etc. as discussed above in connection with FIG. 5.

While this disclosure has been described as having exemplary embodiments, this application is intended to cover any variations, uses, or adaptations using the general principles set forth herein. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

What is claimed is:

1. A method for distributing a plurality of RFID-tagged items carried in a mobile RFID container, the method comprising:
   providing the mobile RFID container comprising:
      an RFID detector configured to conduct RFID scans and generate scan data concerning the RFID-tagged items carried in the mobile RFID container; and
      location determining circuitry;
   conducting one or more RFID scans, by the RFID detector to generate scan data concerning the plurality of RFID-tagged items in the mobile RFID container;
   generating, using the location determining circuitry, location data concerning a location of the mobile RFID container; and
   processing the scan data and the location data to determine the location of the mobile RFID container at times when the plurality of RFID-tagged items in the mobile RFID container have changed,
   wherein the one or more RFID scans are conducted in response to one or more of the following: the location of the mobile RFID container relative to a defined geographical location, determining that the plurality of RFID-tagged items in the mobile RFID container have been accessed, and receiving a request from a remote device.

2. The method of claim 1, further comprising generating invoicing data, credit data, and/or restocking data based on the scan and location data.

3. The method of claim 1, further comprising transmitting the scan and location data to a remote device, and wherein the remote device performs the processing step.

4. The method of claim 1, wherein the location determining circuitry uses at least one of multilateration of radio signals or global positioning to generate the location data.

5. The method of claim 1, wherein the mobile RFID container comprises one or more of the following: a case, a rail car, a cargo container, and a vehicle.

6. The method of claim 1, further comprising monitoring one or more of the following: temperature, humidity, acceleration, pressure, and battery level, and responsively generating monitored condition data indicative thereof.

7. The method of claim 6, further comprising processing the monitored condition data and location data to determine the location of the mobile RFID container at times when the monitored condition data is generated.

8. The method of claim 1, further comprising transporting the mobile RFID container from a first geographic location to a second geographic location that is remote from the first geographic location.

9. The method of claim 8, wherein the at least one of the geographic locations corresponds to an end user.

10. A method for distributing a plurality of RFID-tagged items carried in a mobile RFID container, the method comprising:

providing the mobile RFID container comprising;
an RFID detector configured to conduct RFID scans and generate scan data concerning the plurality of RFID-tagged items carried in the mobile RFID container; and
location determining circuitry;
defining one or more geofence boundaries, each of which corresponds to a particular geographical location;
generating, by the location determining circuitry, location data concerning a location of the mobile RFID container;
monitoring the location data to determine the location of the mobile RFID container; and
performing at least one automated process in response to the location of the mobile RFID container relative to at least one geofence boundary,
wherein at least one automated process is performed in response to one or more of the following: the mobile RFID container being within a predetermined distance of a geofence boundary, the mobile RFID container entering a geofence boundary, the mobile RFID container being within a geofence boundary, or the mobile RFID container exiting a geofence boundary.

11. The method of claim 10, wherein the at least one automated process comprises at least one of the following: conducting at least one RFID scan to generate scan data concerning the plurality of RFID-tagged items in the mobile RFID container, generating a restocking order to have one or more items added to the mobile RFID container, generating an invoice, updating software of the mobile RFID container, updating firmware of the mobile RFID container, or monitoring at least one parameter of the mobile RFID container.

12. The method of claim 11, further comprising processing the scan data to determine if the plurality of RFID-tagged items in the mobile RFID container changed while the container was within the geofence boundary.

13. The method of claim 11, wherein the at least one parameter of the mobile RFID container comprises at least one of temperature, humidity, acceleration, pressure, and battery level.

14. The method of claim 10, wherein the mobile RFID container comprises one of a mobile container, a cargo container, a rail car, and a vehicle.

15. A method for distributing a plurality of RFID-tagged items carried in a mobile RFID container, the method comprising:
providing the mobile RFID container comprising:
an RFID detector configured to conduct RFID scans and generate scan data concerning the plurality of RFID-tagged items carried within the mobile RFID container; and
location determining circuitry;
while at a first geographic location, conducting one more RFID scans to generate scan data concerning contents of the mobile RFID container;
while at the first geographic location, generating, by the location determining circuitry, location data concerning a first location of the mobile RFID container;
while at a second geographic location that is remote from the first geographic location conducting one more additional RFID scans to generate scan data concerning the plurality of RFID-tagged items in the mobile RFID container;
while at the second geographic location, generating, by the location determining circuitry, location data concerning a second location of the mobile RFID container; and
processing the scan data and the location data to determine if the plurality of RFID-tagged items in the mobile RFID container have changed between when the mobile RFID container was at the first geographic location and the second geographic location,
wherein the one or more RFID scans are conducted in response to one or more of the following: determining the location of the mobile RFID container relative to the first and second geographic locations, determining that the contents of the mobile RFID container have been accessed, and receiving a request from a remote device.

16. The method of claim 15, further comprising determining the location of the mobile RFID container at the times when RFID scans are performed.

17. The method of claim 15, further comprising:
defining a first geofence boundary corresponding to the first geographic location;
defining a second geofence boundary corresponding to the second geographic location; monitoring the location of the mobile RFID container;
conducting at least one RFID scan in response to the mobile RFID container being within, entering, or exiting the first geofence boundary; and
conducting at least one additional RFID scan in response to the mobile RFID container being within, entering, or exiting the second geofence boundary.

18. The method of claim 16, wherein the location determining circuitry uses at least one of multilateration of radio signals or global positioning to generate the location data.

19. The method of claim 16, wherein the mobile RFID container comprises one of a mobile case, a cargo container and a vehicle.

20. The method of claim 1, wherein the mobile RFID container is a suitcase configured with compartments configured to receive the plurality of RFID-tagged items, and wherein the mobile RFID container is configured to transport the plurality of RFID-tagged items and the plurality of RFID detector that is configured to conduct the RFID scans and generate the scan data concerning the plurality of RFID-tagged items carried in the suitcase.

21. The method of claim 1, wherein the mobile RFID container further comprises shielding configured to prevent an RFID tag positioned outside of the container from being detected by the RFID detector.

* * * * *